(12) United States Patent
Tang et al.

(10) Patent No.: US 11,140,475 B2
(45) Date of Patent: Oct. 5, 2021

(54) SOUND ABSORBING MATERIAL, METHOD FOR PROCESS SAME AND SPEAKER USING SAME

(71) Applicant: AAC Acoustic Technologies (Shenzhen) Co., Ltd., Shenzhen (CN)

(72) Inventors: Kun Tang, Shenzhen (CN); Hongshu Feng, Shenzhen (CN); Jiqiang Dai, Shenzhen (CN); Hezhi Wang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 93 days.

(21) Appl. No.: 16/522,692

(22) Filed: Jul. 26, 2019

(65) Prior Publication Data

US 2020/0037065 A1    Jan. 30, 2020

(30) Foreign Application Priority Data

Jul. 28, 2018    (CN) .......................... 201810849601.8

(51) Int. Cl.
*H04R 1/28* (2006.01)
*G10K 11/165* (2006.01)
(Continued)

(52) U.S. Cl.
CPC .......... *H04R 1/2876* (2013.01); *C01B 39/04* (2013.01); *C01B 39/06* (2013.01); *C01B 39/38* (2013.01);
(Continued)

(58) Field of Classification Search
CPC ......... C01B 39/06; C01B 39/48; C01B 39/04; C01B 39/38; C01B 39/40; G01K 11/165; H04R 1/288; H04R 1/2876
See application file for complete search history.

(56) References Cited

U.S. PATENT DOCUMENTS 4,709,024 A * 11/1987 Sato .................... C07D 201/04
540/535
4,717,769 A * 1/1988 Sato ........................ B01J 29/04
540/535
(Continued)

FOREIGN PATENT DOCUMENTS

CN    105872920 A  *  8/2016
CN    106744992 A  *  5/2017
(Continued)

OTHER PUBLICATIONS

Fang et al.,"Aromatization over nanosized Ga-containing ZSM-5 zeolites prepared by different methods: Effect of acidity of active Ga species on the catalytic performance", Journal of Energy Chemistry vol. 26, Issue 4, Jul. 2017, pp. 768-775 (Year: 2017).*
(Continued)

*Primary Examiner* — David M Brunsman
(74) *Attorney, Agent, or Firm* — W&G Law Group

(57) ABSTRACT

The present disclosure provides a sound absorbing material. The sound absorbing material comprising MFI-structural-type molecular sieves, the MFI-structural-type molecular sieves comprises frameworks and extra-framework cations, the framework comprising $SiO_2$ and a metal oxide $M_xO_y$ containing a metal element M, wherein a molar ratio of Si/M is between 220 and 600 in the framework, the metal element M comprises aluminum, and the extra-framework cations are at least one of hydrogen ions, alkali metal ions and alkaline earth metals. The present also provides a method for preparing a sound absorbing material and a speaker box using the sound absorbing material.

9 Claims, 4 Drawing Sheets

(51) Int. Cl.
*C01B 39/06* (2006.01)
*C01B 39/04* (2006.01)
*C01B 39/40* (2006.01)
*C01B 39/38* (2006.01)

(52) U.S. Cl.
CPC ............ *C01B 39/40* (2013.01); *H04R 1/288* (2013.01); *G10K 11/165* (2013.01)

(56) References Cited

U.S. PATENT DOCUMENTS

| | | | | |
|---|---|---|---|---|
| 5,212,302 | A * | 5/1993 | Kitamura | B01J 29/035 |
| | | | | 540/536 |
| 8,687,836 | B2 * | 4/2014 | Lin | H04R 1/28 |
| | | | | 381/346 |
| 10,271,130 | B2 * | 4/2019 | Feng | G10K 11/002 |
| 2019/0202706 | A1 * | 7/2019 | Tang | C01B 39/00 |
| 2019/0238972 | A1 * | 8/2019 | Feng | G10K 11/162 |
| 2020/0031678 | A1 * | 1/2020 | Feng | C01B 39/46 |
| 2020/0031679 | A1 * | 1/2020 | Tang | G10K 11/162 |
| 2020/0037062 | A1 * | 1/2020 | Dai | B01J 29/44 |
| 2020/0037063 | A1 * | 1/2020 | Feng | H04R 1/288 |
| 2020/0211524 | A1 * | 7/2020 | Feng | H04R 1/025 |

FOREIGN PATENT DOCUMENTS

| | | |
|---|---|---|
| CN | 106792387 A1 | 5/2017 |
| CN | 106865563 A * | 6/2017 |
| CN | 107216637 A * | 9/2017 |

OTHER PUBLICATIONS

Cuiyun et al., "Sound absorption characteristics of a high-temperature sintering porous ceramic material", Applied Acoustics vol. 73, Issue 9, Sep. 2012, pp. 865-871 (Year: 2012).*

Cizmek et al,"Dissolution of high-silica zeolites in alkaline solutions I. Dissolution of silicalite-1 and ZSM-5 with different aluminum content", Microporous Materials vol. 4, Issues 2-3, Jun. 1995, pp. 159-168 (Year: 1995).*

Giannetto et al, "Synthesis and characterization of [Cr,Al]-ZSM-5 zeolites",Zeolites 19:169-174, 1997 (Year: 1997).*

Vitale et al., "One-pot preparation and characterization of bifunctionalNi-containing ZSM-5 catalysts", Applied Catalysis A: General 452 (2013) 75-87 (Year: 2013).*

1st Office Action dated Mar. 3, 2021 by SIPO in related Chinese Patent Application No. 201810849601.8 (7 Pages).

* cited by examiner

US 11,140,475 B2

SOUND ABSORBING MATERIAL, METHOD FOR PROCESS SAME AND SPEAKER USING SAME

FIELD OF THE DISCLOSURE

The present disclosure relates to a sound absorbing material, and more particularly to a sound absorbing material, preparation method thereof and a speaker box using the same.

DESCRIPTION OF RELATED ART

With the development of technology and the improvement of living standards, there are increasingly high demands on the performance of speaker boxes. In particular, for a speaker box of a mobile phone, it is required to provide excellent acoustic performance while being as small as possible. The sound quality of a speaker box is closely related to the design and manufacturing process, especially to the size of the posterior cavity of the speaker box. Under normal circumstances, the smaller the posterior cavity of the speaker box, the worse the acoustic response of the low frequency band, and the worse the acoustic performance such as sound quality, so it is necessary to try to enlarge the posterior cavity of the speaker box and enhance the acoustic response of the low frequency band. In the prior art, the posterior cavity of the speaker box is usually filled with porous carbon, silica, molecular sieves and other sound absorbing materials to increase the virtual volume of the posterior cavity, enhance the sound compliance of the gas in the posterior cavity, thereby improving the low frequency performance, wherein the molecular sieves are most effective in improving the low frequency performance.

Ordinary molecular sieves tend to adsorb moisture in the air at room temperature, which occupies the micropores and results in decreased speaker performance; they also tend to adsorb organic matter, causing molecular sieve failure and resulting in low stability of the speaker performance. By optimizing the range of the molar ratio of Si/Al in the molecular sieve, the present invention obtains an MFI-structural-type molecular sieve which does not easily absorb moisture and has a high air absorption and desorption capacity under normal temperature. Such a molecular sieve is not only effective in improving the low frequency performance but can provide good stability in improving the low frequency performance.

Therefore, it is desired to provide new and improvement sound absorbing materials, preparation method thereof and a speaker box using the same to overcome the aforesaid problems.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
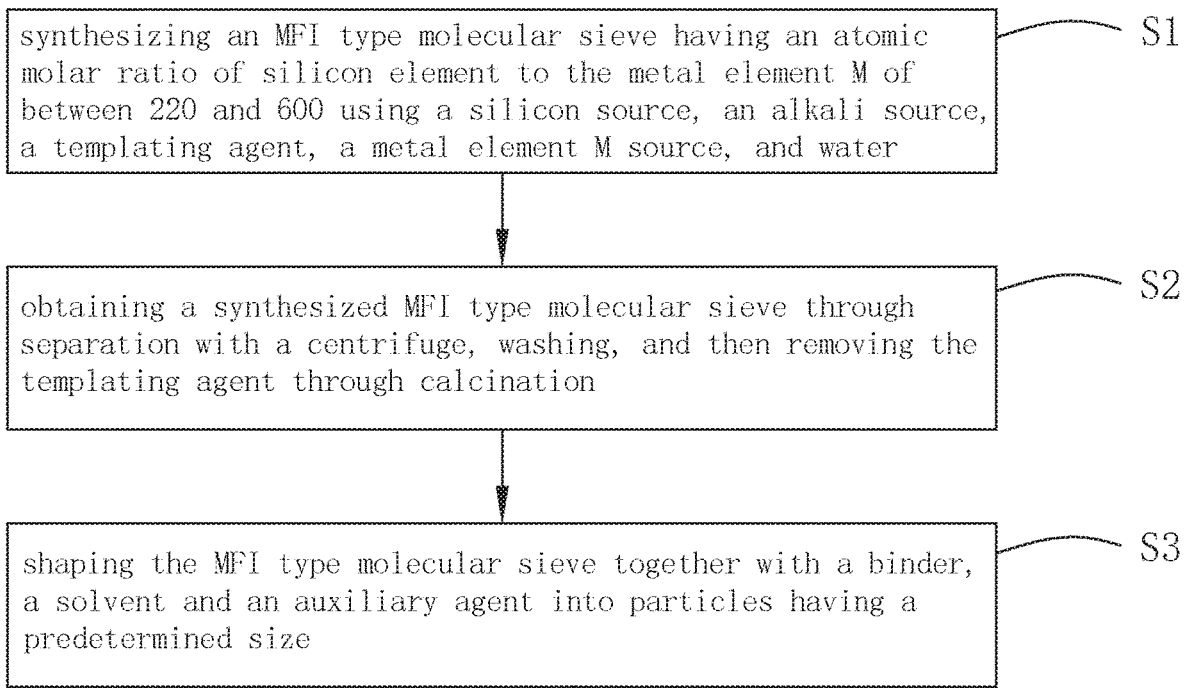
FIG. 1 is a flow chart showing a method for preparing a sound absorbing material provided by the present invention.

The present disclosure will be hereinafter described in detail below with reference to the attached drawings and embodiments thereof.

Embodiments of the present invention relate to a sound absorbing material comprising an MFI-structural-type molecular sieve comprising a framework and an extra-framework cation, the framework comprising $SiO_2$ and a metal oxide $M_xO_y$ containing a metal element M. The Si/M atom molar ratio in the framework is between 220 and 600, wherein the metal element M comprises aluminum, and the extra-framework cation is at least one of a hydrogen ion, an alkali metal ion or an alkaline earth metal. For example, the silicon to aluminum atomic molar ratio in the framework is preferably between 250 and 500, more preferably between 280 and 450.

Compared with the prior art, the MFI-structural-type molecular sieve of the embodiments of the present invention includes silicon dioxide having uniform micropores that absorb and desorb air molecules under the action of sound pressure, thereby increasing the volume of the virtual acoustic cavity. When such sieves are filled into the posterior cavity of a speaker, it can significantly improve the low frequency effect of the speaker and improve its low frequency acoustic performance. Because the MFI-structural-type molecular sieve can be placed in a small cavity due to its small size, it can solve the problem that the sound cavity of the speaker is small and difficult to accommodate the sound absorbing material, thus meeting the requirements in making smaller speakers. In addition, the MFI-structural-type molecular sieve further comprises an extra-framework cation, which can effectively improve the stability of the molecular sieve, thereby improving the performance stability of the speaker. It should be noted that when the molar ratio of silicon to aluminum is relatively low, the microporous structures for absorption and desorption in the MFI structure will significantly absorb the moisture in the air, which occupies most microporous channels of the MFI molecular sieve, resulting in poorer low frequency improvement effect; when the molar ratio of silicon to aluminum is overly high, the Al content in the MFI structure will be too low and the amount of cations introduced is too small, such that the organic matter in the air and the speaker box is easy to enter the molecular sieve channels in use, thus invalidating the ability to improve the low frequency performance. Therefore, in the present embodiment, the molar ratio of silicon to aluminum atoms is between 220 and 600, preferably between 250 and 500, and more preferably between 280 and 450, so that the sound absorbing material has better low frequency improvement effect and better stability in improving the low frequency performance.

Specifically, in the present embodiment, the molar ratio of silicon to aluminum atoms of the MFI type molecular sieve is between 220 and 600, preferably between 250 and 500, and more preferably between 280 and 450.

In addition, the metal element M of the framework may further include a trivalent metal ion and/or a tetravalent metal ion other than Al (aluminum). In the present embodiment, the trivalent metal ion and/or the tetravalent metal ion further includes one or more of a chromium ion, an iron ion, a gallium ion, a nickel ion, a titanium ion, a zirconium ion, and a cerium ion. It will be understood by those skilled in the art that the trivalent metal ion and the tetravalent metal ion are not limited to the above examples, and may be other metal ions, which does not affect the effects of the present invention.

It should be noted that in the present embodiment, the MFI-structural-type molecular sieve has a particle size larger than 10 nm. Preferably, the MFI-structural-type molecular sieve has a particle size larger than 10 nm and less than 10 microns. Since the MFI-structural-type molecular sieve has a small particle size, it needs to be formed into larger particles together with a binder in actual use, in order to be suitable to be used as a sound absorbing material.

It is worth mentioning that in the present embodiment, the molecular sieve may be a pure phase MFI-structural-type molecular sieve. Due to the high purity of the pure phase molecular sieve, a speaker box filled with the MFI-structural-type molecular sieves in the posterior cavity has better acoustic performance in the low frequency band. The molecular sieve may also be a mixed phase MFI type molecular sieve containing other hetero-phases such as MEL, BEA, etc., without affecting the effects of the present invention.

The present invention also provides a method for preparing the above sound absorbing material, and the specific process is as shown in FIG. 1.

Step S1: synthesizing an MFI type molecular sieve having an atomic molar ratio of silicon element to the metal element M of between 220 and 600 using a silicon source, an alkali source, a templating agent, a metal element M source, and water.

In this step, the MFI type molecular sieve to be synthesized preferably has an atomic molar ratio of silicon element to the metal element M of between 250 and 500, more preferably between 280 and 450 for better effect.

Regarding step S1, specifically, the source of the metal element M is exemplified by an aluminum source, and the raw materials for synthesis (the silicon source, the aluminum source, the templating agent, the alkali source, etc.) are added to a synthesis reactor for a crystallization reaction to produce an MFI type molecular sieve powder. The crystallization reaction is generally carried out in an aqueous phase for a certain period of time, and is also known as a hydrothermal reaction; the temperature of the hydrothermal reaction generally ranges from room temperature to 250° C., preferably from room temperature to 180° C.; the pressure of the hydrothermal reaction is generally the pressure generated by the solvent (the water) itself along with temperature changes.

It should be noted that, in the present embodiment, the silicon source includes at least one of tetraethyl orthosilicate, silica sol, and sodium silicate; the aluminum source includes at least one of aluminum nitrate, aluminum sulfate, sodium aluminate, and aluminum oxide; the alkali source comprises at least one of sodium hydroxide, potassium hydroxide, lithium hydroxide, and an organic base; the templating agent is at least one of an organic amine or an organic quaternary ammonium salt, a tetrapropyl quaternary ammonium salt or a quaternary ammonium base, and sodium lauryl sulfate.

Step S2: obtaining a synthesized MFI type molecular sieve through separation with a centrifuge, washing, and then removing the templating agent through calcination.

Regarding step S2, the predetermined period of time is the hydrothermal reaction time, and the hydrothermal reaction time is generally from half an hour to several months, preferably from 4 hours to 240 hours, depending on the circumstances; the particle size of the MFI type molecular sieve after the hydrothermal reaction is controlled to 5 nm to 20 μm, preferably 10 nm to 10 μm; and the calcination temperature is 350° C. to 850° C., preferably 500° C. to 700° C.

Step S3: shaping the MFI type molecular sieve together with a binder, a solvent and an auxiliary agent into particles having a predetermined size.

Regarding step S3, in particular, since the particle size of the MFI molecular sieve formed in step S2 is too small, if the molecular sieve is directly filled in the posterior cavity of the speaker box as a sound absorbing material, it can easily leak out of the filling area, affecting the normal use of the speaker box. Therefore, in step S3 a binder is added to the MFI type molecular sieves to form granular molecular sieves to be suitable for filling as a sound absorbing material. The particle size is preferably from 10 μm to 1000 μm, more preferably from 50 μm to 500 μm. The binder mainly comprises an inorganic binder and an organic polymer binder; the inorganic binder may be selected from activated alumina, silica sol, etc.; the organic polymer binder may be selected from acrylates, epoxies, polyurethanes, and so on. The solvent mainly refers to water and various common organic solvents, such as ethanol, toluene, acetone, tetrahydrofuran and the like. Among them, the auxiliary agent refers to other substances added in small amounts, usually less than 5%.

It is worth mentioning that there can be a further step of subjecting the MFI-structural-type molecular sieve to cation exchange after step S2 and before step S3 to obtain different types of MFI molecular sieves. This step may be carried out by using an ammonium salt, a monovalent copper salt, a monovalent silver salt, a monovalent gold salt, an alkali metal salt or an alkaline earth metal salt for exchange with the zeolite. The ammonium salt may be ammonium chloride, ammonium nitrate, ammonium sulfate, ammonium carbonate or the like; the copper salt may be cuprous chloride, the silver salt may be silver nitrate; the alkali metal may be selected from lithium salt, sodium salt, potassium salt, rubidium salt, and the like; the anion of the alkali metal salt may be a chloride ion, a sulfate ion, a nitrate ion, etc.; the alkaline earth metal may be a magnesium salt, a calcium salt, a barium salt, etc., and the anion of the alkali metal salt may be a chloride ion, a sulfate ion, a nitrate ion, etc.

Embodiments of the invention are explained below in conjunction with specific examples.

Figure 2:
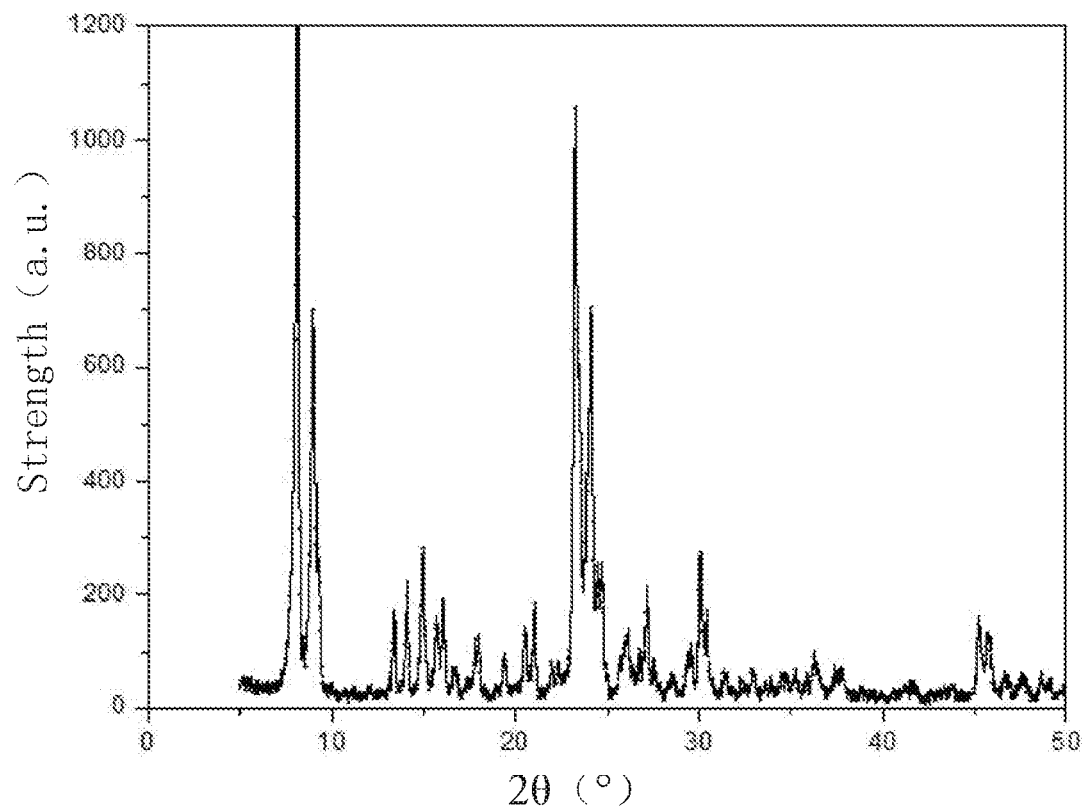
FIG. 2 is an XRD spectrum of the MFI-structural-type molecular sieve provided by Example 1 of the present invention.
Figure 3:
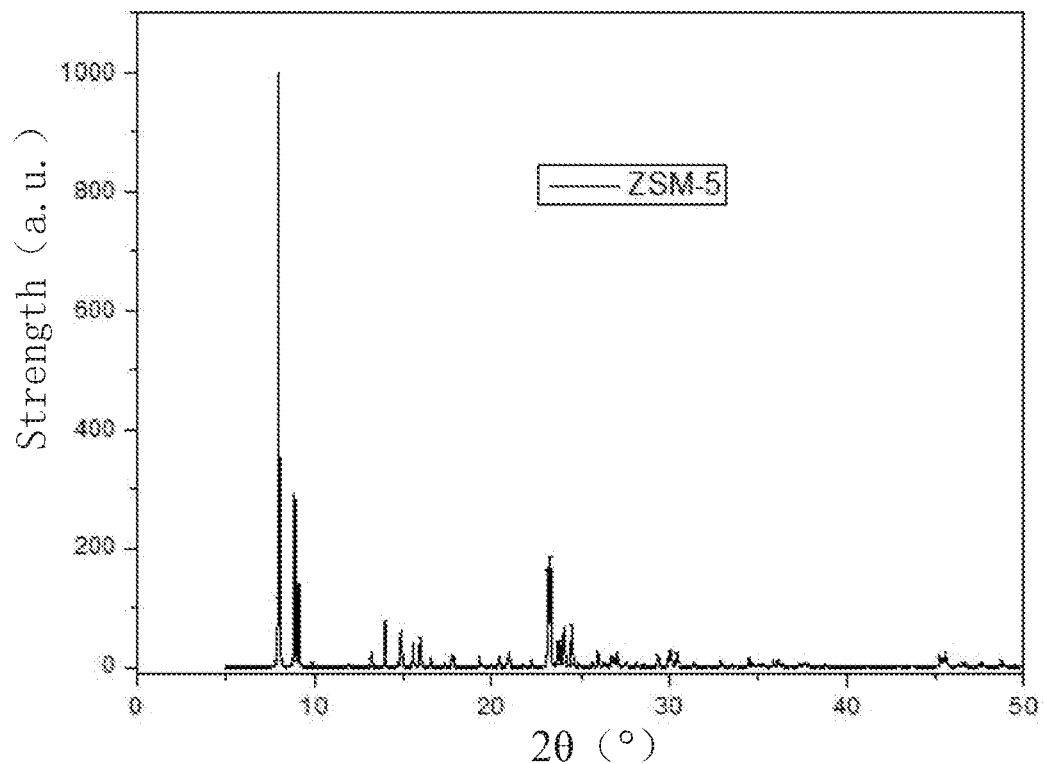
FIG. 3 is a XRD standard spectrum of the ZSM-5 of the present invention.

In the method for preparing a sound absorbing material of the present invention according to Example 1, an MFI type molecular sieve having a silica to alumina molar ratio of 350 was synthesized using a silicon source, an aluminum source, an alkali source, a templating agent, and water. In the example, the templating agent is at least one of tetrapropylammonium bromide, tetrapropylammonium hydroxide, tetrapropylammonium chloride, tetrapropylammonium iodide and tetrapropylammonium fluoride. The XRD pattern of the MFI type molecular sieve is as shown in FIG. 2, and the XRD standard spectrum of ZSM-5 is shown in FIG. 3. The comparison shows that the characteristic peaks in FIG. 2 and FIG. 3 are the same.

In the method for preparing a sound absorbing material of the present invention according to Example 2, an MFI type molecular sieve having a silica to alumina molar ratio of 350 was synthesized using a silicon source, an aluminum source, an alkali source, a templating agent, and water. In the example, the templating agent is at least one of tetrapropylammonium bromide, tetrapropylammonium hydroxide, tetrapropylammonium chloride, tetrapropylammonium iodide and tetrapropylammonium fluoride. The MFI type molecular sieve was exchanged with a sodium salt to produce a sodium type MFI structure. The sodium salt includes at least one of sodium chloride, sodium sulfate, sodium nitrate and the like, but is not limited thereto.

In the method for preparing a sound absorbing material of the present invention according to Example 3, an MFI type molecular sieve having a silica to alumina molar ratio of 350 was synthesized using a silicon source, an aluminum source, an alkali source, a templating agent, and water. In the example, the templating agent is at least one of tetrapropylammonium bromide, tetrapropylammonium hydroxide, tetrapropylammonium chloride, tetrapropylammonium iodide and tetrapropylammonium fluoride. The MFI type molecular sieve was exchanged with a silver salt to obtain a silver type MFI structure. The silver salt is silver nitrate, but is not limited thereto.

In the method for preparing a sound absorbing material of the present invention according to Example 4, an MFI type molecular sieve having a silica to alumina molar ratio of 250 was synthesized using a silicon source, an aluminum source, an alkali source, a templating agent, and water, wherein the templating agent is at least one of tetrapropylammonium bromide, tetrapropylammonium hydroxide, tetrapropylammonium chloride, tetrapropylammonium iodide and tetrapropylammonium fluoride.

In the method for preparing a sound absorbing material of the present invention according to Example 5, an MFI type molecular sieve having a silica to alumina molar ratio of 450 was synthesized using a silicon source, an aluminum source, an alkali source, a templating agent, and water, wherein the templating agent is at least one of tetrapropylammonium bromide, tetrapropylammonium hydroxide, tetrapropylammonium chloride, tetrapropylammonium iodide and tetrapropylammonium fluoride.

In the method for preparing a sound absorbing material of the present invention according to Comparative Example 1, an MFI type molecular sieve having a silica to alumina molar ratio of 100 was synthesized using a silicon source, an aluminum source, an alkali source, a templating agent, and water, wherein the templating agent is at least one of tetrapropylammonium bromide, tetrapropylammonium hydroxide, tetrapropylammonium chloride, tetrapropylammonium iodide, and tetrapropylammonium fluoride.

In the method for preparing a sound absorbing material of the present invention according to Comparative Example 2, an MFI type molecular sieve having a silica to alumina molar ratio of 900 was synthesized using a silicon source, an aluminum source, an alkali source, a templating agent, and water, wherein the templating agent is at least one of tetrapropylammonium bromide, tetrapropylammonium hydroxide, tetrapropylammonium chloride, tetrapropylammonium iodide, and tetrapropylammonium fluoride.

The molecular sieves synthesized in Examples 1-5 and Comparative Examples 1-2 of the present invention were separately mixed with a solvent, a binder and an auxiliary agent to prepare a suspension mixture, which was dried and pulverized to obtain granular molecular sieves, and then filled respectively in the posterior cavity (the volume of the tool rear cavity is 1 cubic centimeter, or 1 cc for short) of a speaker for acoustic performance measurement. The results are shown in Table 1.

The speaker box (containing the posterior cavity and the sound absorbing material) was allowed to operate in an environment with a temperature of 95° C. for an aging test. The differences in acoustic performance before and after the aging test were measured. Such a test is known for short as high temperature sweeping. The results are shown in Table 2.

TABLE 1

F0 and Q values of the resonance frequency before and after addition of the molecular sieves to the posterior cavity of the speaker box

| | 1 CC | | | | | |
|---|---|---|---|---|---|---|
| | Cavity | | After addition of 1 cc of low frequency improving material | | Reduction | |
| Sample | $F_0$ (Hz) | Q | $F_0$ (Hz) | Q | $\Delta F_0$ (Hz) | $\Delta Q$ |
| Example 1 | 925 | 1.3 | 669 | 0.6 | 256 | 0.7 |
| Example 2 | 928 | 1.4 | 674 | 0.8 | 254 | 0.6 |
| Example 3 | 927 | 1.4 | 675 | 0.6 | 252 | 0.8 |
| Example 4 | 926 | 1.4 | 669 | 0.7 | 257 | 0.7 |
| Example 5 | 927 | 1.3 | 672 | 0.5 | 255 | 0.8 |
| Comparative Example 1 | 926 | 1.2 | 776 | 0.6 | 150 | 0.6 |
| Comparative Example 2 | 928 | 1.4 | 677 | 0.6 | 251 | 0.8 |

TABLE 2

Difference $\Delta F0$ on low frequency improving performance before and after adding low-frequency improving materials to the posterior cavity of the speaker

| | High temperature sweeping | | |
|---|---|---|---|
| Sample | $\Delta F_0$(Hz) before test | $\Delta F_0$(Hz) after test | $\Delta F_0$ difference before and after test (Hz) |
| Example 1 | 105 | 82 | 24 |
| Example 2 | 104 | 83 | 21 |
| Example 3 | 102 | 80 | 22 |
| Example 4 | 104 | 82 | 22 |
| Example 5 | 103 | 80 | 23 |
| Comparative Example 1 | 65 | 39 | 26 |
| Comparative Example 2 | 101 | 30 | 71 |

As can be concluded from Table 1, after filling the molecular sieves of Examples 1 to 5 into the posterior cavity of the speaker, the F0 and Q values of the resonance frequency of the speaker are greatly reduced. As can be concluded from Table 2, the molecular sieves of Examples 1 to 5 still have a high low-frequency improving effect on the speaker after the high temperature sweeping. After filling the molecular sieves of Comparative Example 1 into the posterior cavity of the speaker, the resonance frequency of the speaker is not greatly reduced, and the low-frequency performance is poorly improved; after filling the molecular sieves of Comparative Example 2 into the posterior cavity of the speaker, and subjecting the speaker to an aging test by high temperature sweeping, the resonance frequency of the speaker is significantly reduced and the performance stability is poor.

Figure 4:
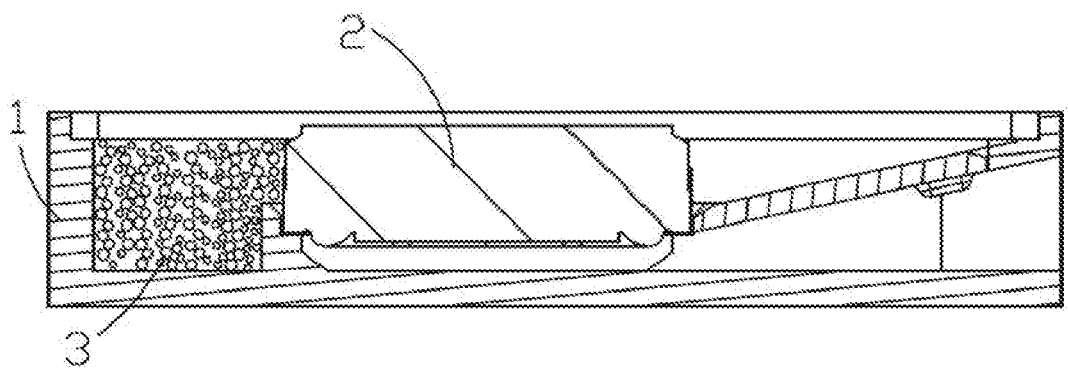
FIG. 4 is a schematic structural view of a speaker box of the present invention.

The present invention also provides a speaker box 100 comprising, as shown in FIG. 4, a housing 1 having a receiving space, a speaker 2 disposed in the housing 1, and a posterior cavity 3 enclosed by the speaker 2 and the housing 1, the posterior cavity 3 being filled with the above-mentioned sound absorbing material to increase the sound compliance of the air in the posterior cavity, thereby improving the low frequency performance of the speaker box.

Compared with the related art, the sound absorbing material of the present invention has uniform micropores because the MFI-structural-type molecular sieve comprises silicon dioxide, and the micropores absorb and desorb air molecules under the action of sound pressure, thereby increasing the volume of the virtual acoustic cavity. When the material is filled in the posterior cavity of the speaker box, it can significantly improve the low frequency effect of the speaker box and improve its low frequency acoustic performance. Because the MFI-structural-type molecular sieve can be placed in a small cavity due to its small size, it can solve the problem that the sound cavity of the speaker box is small and difficult to accommodate the sound absorbing material, thus meeting the requirements in making smaller speakers. By optimizing the range of the molar ratio of Si/Al atoms in the molecular sieve, the present invention obtains an MFI-structural-type molecular sieve which does not easily absorb moisture and has a high air absorption and desorption capacity under normal temperature. Such a molecular sieve is not only effective in improving the low frequency performance but can provide good stability in improving the low frequency performance. The Si/Al molar ratio of the molecular sieve is between 220 and 600, preferably between 250 and 500, and more preferably between 280 and 450.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sound absorbing material comprising MFI-structural-type molecular sieves, the MFI-structural-type molecular sieves comprises frameworks and extra-framework cations, the framework comprising $SiO_2$ and a metal oxide $M_xO_y$ containing a metal element M, x and y are integers greater than 0, x refer to a metal composition ratio, y refer to an oxygen composition ratio, wherein a molar ratio of Si/M is between 280 and 450 in the framework, the metal element M comprises aluminum, and the extra-framework cations are hydrogen ions, the metal element M further comprises at least one of chromium, nickel and hafnium.

2. The sound absorbing material according to claim 1, wherein the MFI-structural-type molecular sieve has a particle size larger than 10 nm.

3. The sound absorbing material according to claim 2 wherein the MFI-structural-type molecular sieve has a particle size of less than 10 microns.

4. The sound absorbing material according to claim 3, wherein the MFI-structural-type molecular sieve comprises a pure phase MFI-structural-type molecular sieve or a mixed phase MFI-structural-type molecular sieve containing MEL phase or BEA phase.

5. The sound absorbing material according to claim 2, wherein the MFI-structural-type molecular sieve comprises a pure phase MFI-structural-type molecular sieve or a mixed phase MFI-structural-type molecular sieve containing MEL phase or BEA phase.

6. The sound absorbing material according to claim 1, wherein the MFI-structural-type molecular sieve comprises a pure phase MFI-structural-type molecular sieve or a mixed phase MFI-structural-type molecular sieve containing MEL phase or BEA phase.

7. A speaker box comprising a housing having a receiving space, a speaker disposed within the housing, and a posterior cavity enclosed by the speaker and the housing, wherein the posterior cavity is filled with the sound absorbing material according to claim 1.

8. A method for preparing a sound absorbing material, the method comprising the following steps:
   synthesizing an MFI-structural-type molecular sieve having an atomic molar ratio of silicon element to a metal element M of between 280 and 450 using a silicon source, an alkali source, a templating agent, a metal element M source, and water; the metal element M source comprises aluminum and further comprises at least one of chromium, nickel and hafnium;
   obtaining a synthesized MFI-structural-type molecular sieve through separation with a centrifuge and washing, and then removing the templating agent through calcination;
   shaping the MFI-structural-type molecular sieve with a binder, a solvent, and an auxiliary agent into particles.

9. The method for preparing a sound absorbing material according to claim 8, wherein the templating agent is selected from an organic amine, an organic ammonium salt, an organic alkali, or combinations thereof.

* * * * *